United States Patent [19]
Lindenthal

[11] Patent Number: 5,989,125
[45] Date of Patent: *Nov. 23, 1999

[54] UNIVERSAL JOINT APPARATUS FOR A CARDAN SHAFT

[75] Inventor: Hans Lindenthal, Heidenheim, Germany

[73] Assignee: Voith Turbo GmbH and Co., KG, Heidenheim, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/784,081

[22] Filed: Jan. 15, 1997

[30] Foreign Application Priority Data

Jan. 16, 1996 [DE] Germany .............. 196 01 290

[51] Int. Cl.$^6$ ........................... F16D 3/41
[52] U.S. Cl. ................................. 464/136
[58] Field of Search ............... 464/130, 132, 464/136

[56] References Cited

U.S. PATENT DOCUMENTS

| | | | |
|---|---|---|---|
| 3,204,428 | 9/1965 | Stokely | 464/130 |
| 4,705,490 | 11/1987 | Lindenthal | 464/132 |
| 4,895,549 | 1/1990 | Lindenthal | 464/136 |
| 5,547,423 | 8/1996 | Lindenthal et al. | 464/136 |

FOREIGN PATENT DOCUMENTS

| | | |
|---|---|---|
| 1 283 037 | 2/1969 | Germany . |
| 34 46 495 C2 | 12/1986 | Germany . |
| 3544253 | 6/1987 | Germany . |
| 89 06 246 | 3/1990 | Germany . |
| 86 34 527 | 10/1990 | Germany . |
| 00202 6990 | 9/1989 | U.S.S.R. . |
| 1570480 A1 | 9/1989 | U.S.S.R. . |
| 2 168 782 | 6/1986 | United Kingdom . |

*Primary Examiner*—Eileen Dunn Lillis
*Attorney, Agent, or Firm*—Randall J. Knuth

[57] ABSTRACT

A universal joint apparatus having jointed shaft suited for transmitting high torques, comprising a spider and two yokes for fitting the arms of the spider. Each spider arm is fitted, with a bearing setup having a radial bearing with an outer ring and an inner ring, an axial bearing arranged in the area of the spider arm wrist, in a yoke eye associated with the latter. The axial bearing is disposed in a connecting structure of elastic behavior.

16 Claims, 6 Drawing Sheets

UNIVERSAL JOINT APPARATUS FOR A CARDAN SHAFT

BACKGROUND OF THE INVENTION

The invention relates to a universal joint for a jointed haft.

Spider bearing apparatuses are known in various styles from the following documents:

1. DE 35 44 253 C1
2. DE 34 46 495 C2
3. SU 15 07 480 A1

DE 35 44 253 C1 discloses a spider bearing apparatus comprising a radial bearing and an axial bearing, the inner ring of the radial bearing resting on its outside via a collar on the spider arm end face and featuring inside a further collar that forms the inner ring of the axial bearing. The axial force is not introduced by way of collars on the spider arm wrist, but via the spider arm end face. The radially outer collar that provides support on the spider arm end face is designed as a detachable component, facilitating both the manufacture of the bearing sleeve itself and also the assembly and axial play adjustment. A favorable embodiment is marked by the ability to remove the collar disk after assembly.

DE 34 46 495 C2 teaches a universal joint style with a spider whose arms are joined to the arms of two yokes each by way of an antifriction bearing apparatus. The latter comprises a radial bearing with an inner ring and an outer ring secured against axial displacement in the eye of the yoke as well as an axial bearing arranged radially within the radial bearing on the spider arm. The outer ring of the radial bearing features a raceway for the rollers of the axial bearing. The inner ring of the radial bearing has a collar disposed radially inside, which extends away from the spider arm axis and is fashioned as a radially inner raceway for the rollers of the axial bearing. The design of the inner ring of the radial bearing is such that it is placed on the spider arm up to an outer stop fashioned as a collar.

Common to both designs is that the occurring transverse forces are introduced in the yoke as traction forces in the direction of the spider arm axis away from the axis of the joint. However, this makes it necessary to secure the bearing rings in this direction and requires additional force transmission elements for transmitting the axial forces that are directed away from the joint axis on the shortest path to the yoke, which expresses itself in a greater number of components, elevated assembly expense and thus additional cost.

A reversal of the force introduction in the yoke is realized with a design according to SU 15 07 480 A1. Here, the axial bearing is arranged in the area of the spider arm wrist. The outer raceway of the axial bearing, viewed in axial direction, is formed by the inner ring or sleeve of the radial bearing. The inner raceway is formed by a separate annular element featuring a collar that bears on the yoke while its end face serves as a bearing face for the end face of the outer ring of the radial bearing, which end face is directed toward the axis of the joint. But this design requires a high manufacturing accuracy in order to guarantee an optimum load performance of the axial bearing. Under load, however, especially under the effect of transverse acceleration, this design leads to an unsatisfactory transmission and directing of the transverse forces in the yoke, since the components backing the raceways of the axial bearing (inner ring of the radial bearing and annular element, due to its relatively short support in the bearing bore and the rigid fitting of the axial bearing), show under these conditions, appreciable positional deviations from the fitting position relative to one another.

SUMMARY OF INVENTION

According to the invention, a collar is coordinated with the inner ring in its fitting position, disposed inside in axial direction, which extends radially away from the axis of the spider arm fitted in the yoke. It should be understood that the axial direction is the direction substantially parallel to the axis of the spider arm fitted in the yoke, with a view from the axis of the joint. Additionally, the joint axis is the extended axis of the component joined to the yoke and extending through the direct intersection of the spider arm axes or an intersection projected in a plane. The axes of the spider arms offset each 90° relative to one another, may be disposed in a common plane or, offset relative to one another, in parallel planes. The collar of the inner ring of the radial bearing forms, at least indirectly, the outer raceway, in axial direction, of the axial bearing. This means that the collar, for one, can directly form the raceway for the rollers or rolling elements of other design, of the axial bearing. On the other hand, an option is possible that the raceway of the axial bearing, that is, the outer ring of the axial bearing—viewed in fitting position based on the spider arms—bears on the spider arm. The outer ring of the radial bearing features in the fitting position in axial direction, an inner collar that extends radially in the direction of the axis of the spider arm fitted in the yoke. The collar of the outer ring of the radial bearing forms at least indirectly the inner raceway, in axial direction, of the axial bearing. Here as well, both the rolling elements directly and the inner ring of the axial bearing can bear on this surface. Furthermore, the outer ring features a so-called outer collar, which in the fitting position is in axial direction disposed outside and with which a stop is associated in the eye of the yoke. Moreover, associated with the inner ring in fitting position in axial direction, is an outer collar that is directed toward the axis of the spider arm fitted in the yoke which forms an axial stop for seating the inner ring in the area of the spider arm end face. This outer collar allows nonpositive and/or positive connection to the spider arm fitted in the yoke. The design of said collar may be such that it forms a unit with the inner ring, that is, the inner ring and collar forming one component. The collar extends in this case, in the direction of the spider arm axis, at least across part of the spider arm radius. Another option is forming the collar as a separate component. This separate component, e.g., may be of cap-shaped design, preferably such that the cap bears with at least a first part of its inside surface, which is understood as the cap surface which in fitting position is directed toward the joint axis, on the end side of the spider arm fitted in the yoke, and forms with a second part of its cap inside surface, in fitting position, a stop for the inner ring of the radial bearing. The connection between the outer collar associated with the inner ring of the radial bearing and the spider arm fitted in the yoke is effected preferably by means of at least one screw joint.

Contrary to the otherwise rigid bearing design sought after, an elastic incorporation of the axial bearing is achieved with this design. The Inventor has recognized that this elastic incorporation achieves a better bearing pattern and a longer service life of the bearing, and thus also of the universal joint apparatus.

The inventional design of the entire bearing apparatus has the effect that the axial forces directed away from the joint axis, in the direction of the spider arm axis, are supported on the yoke half that opposes the yoke half disposed in the direction of force. The axial bearing disposed in the working direction of the axial force is thus relieved. The axial forces are introduced in the yoke as thrust forces. Furthermore, the blanks for the rings of the radial bearing may be made more thin-walled, which expresses itself in reduced weight. No tapped bores are required in the outer ring, resulting in greater strength and lower cost.

The collar of the inner ring of the radial bearing directed radially outward and the collar of the outer ring of the axial bearing directed radially inward, based on the possible positional change of the individual components of the radial bearing, preferably feature in loaded state substantially equal leverages; that is, the axial bearing, or its rolling elements, are arranged in such a way that their axially extending line of symmetry extends in the area of the line of symmetry of the rolling elements of the radial bearing, that their extensions preferably coincide. This enables in the loaded state, with relative positional change of the individual elements of the radial bearing relative to one another (nonparallelity of the radial bearing raceways) under the effect of the peripheral force, always a nearly parallel position of the raceways of the axial bearing, and thus an optimal load-bearing performance as well as a uniform wear of the rolling elements.

The bearing cap and its connection to the outer collar of the radial bearing outer ring are designed such that the bearing cap is under torque load and elastic deformation of the bearing bore is allowed to displace radially into the outer ring. This can be realized with various styles. For lubrication of the axial bearing and exclusion of dirt, a closure is provided. It shields the space, or prevents access to the axial bearing, between the collars of the inner and outer rings relative to the surroundings. The design of this closure is such that a lubricant supply from outside is possible when needed, whereas the axial bearing is in operating state shielded against the surroundings. This closure bears preferably on the spider arm, specifically on the spider arm wrist.

A bearing closure is associated with each yoke eye. The closure is axially joined with form-fit to the outer ring of the radial bearing. The closure itself is able to absorb, due to the inventional arrangement, deformations of the outer ring by displacement in radial direction. Wear on the closure end faces and in the radial bearing is considerably reduced as compared to prior universal joint bearings.

A closure support in the form of a ring or disk is provided for shielding the radial bearing, between bearing closure and outer collar of the outer ring, which support is in axial direction fixed by means of retaining elements, for instance retaining rings, and/or joined to the bearing closure under form-fit. To minimize under torque load, stresses of the bearing closure in radial direction and to realize a positive joining of the bearing closure to the outer ring of the radial bearing, during elastic deformation of the bearing bore in the yoke, the bearing closure features in the area of its outer periphery, a closure rim which in fitting position extends in radial direction beyond part of the width of the radial bearing, preferably such that said part of the outer circumference of the bearing closure, in particular, shields the rolling elements in axial direction. The closure rim bears in fitting position, with part of its inside surface facing the joint axis on a partial surface of a recess provided for that purpose, on the outer collar of the outer ring of the radial bearing. The design of the closure rim is such that in fitting position it is elastically deformable in radial direction. To that end, it has a reduced cross section. The retaining ring is then disposed between the rim of the bearing closure and the collar and the closure support. To adapt the bearing closure to deformations of the bearing bores, the bearing closure is coupled positively to the outer collar of the outer ring of the radial bearing in a fashion such that yielding possibilities are given in the event of elastic deformations of the closure rim. Two sealing elements are associated with the closure support, for realization of the sealing function.

Another option consists in coupling the bearing closure, for realization of an axial retention, by means of nonpositive or positive connecting elements indirectly, via an intermediate element, to the outer collar of the outer ring of the axial bearing by way of a bearing arrangement. The bearing closure has then, e.g., a rim of U-shaped design. The closure rim bears with part of its end face which in fitting position faces toward the joint axis directly on part of the end face of the recess in the outer ring of the radial bearing that is directed away from joint axis. The design of the bearing closure and outer ring, notably of the collar of the radial bearing, is such that these bear in radial direction on one another. The collar forms with its surface facing toward the spider arm axis a stop, in radial direction, for the closure rim surface facing away from the spider arm axis. To seal the radial bearing relative to the surroundings, in fitting position in the axially outer area, a sealing element, for instance in the form of a ring seal, is provided between bearing closure and outer collar of the outer ring of the radial bearing.

Therefore, the objective underlying the invention is to design a universal joint to the effect that—in addition to reducing the number of components and the assembly expense, increasing the service life of the bearing while at the same time increasing the moments to be transmitted by the jointed shaft apparatus by enhancement of its load capacity, especially of the dynamic load capacity—an optimum load performance of the axial bearing in load state is accomplished. At the same time, the design is meant to be such that the axial forces are always backed by the yoke halves with a working direction toward the axis of the joint, that is, that additional axial retaining elements for the individual bearing rings and the cap will be dispensable and no force-transmitting elements are necessary for transmission of the axial forces directed away from the joint axis on a direct path to the yoke. This means that the axial force is introduced in the yoke always as thrust force. Furthermore, another feature is making in the axial bearing area space available for large spider arm wrist cross sections and sound transitions for a high torque capacity. Another advantage of the inventional solution consists in a reduction of the manufacturing and assembly expense, due to the small number of components and their simple design. Specifically, standard antifriction bearings can be used as axial bearings, or merely standard rolling elements.

Another option, with appropriate material selection and manufacturing accuracy, consists in designing the outer ring of the radial bearing without a collar and, instead, designing the yoke eye such that it assumes the function of the inner collar of the outer ring of the radial bearing.

DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 2b is an enlarged section view of a portion of FIG. 2a;

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
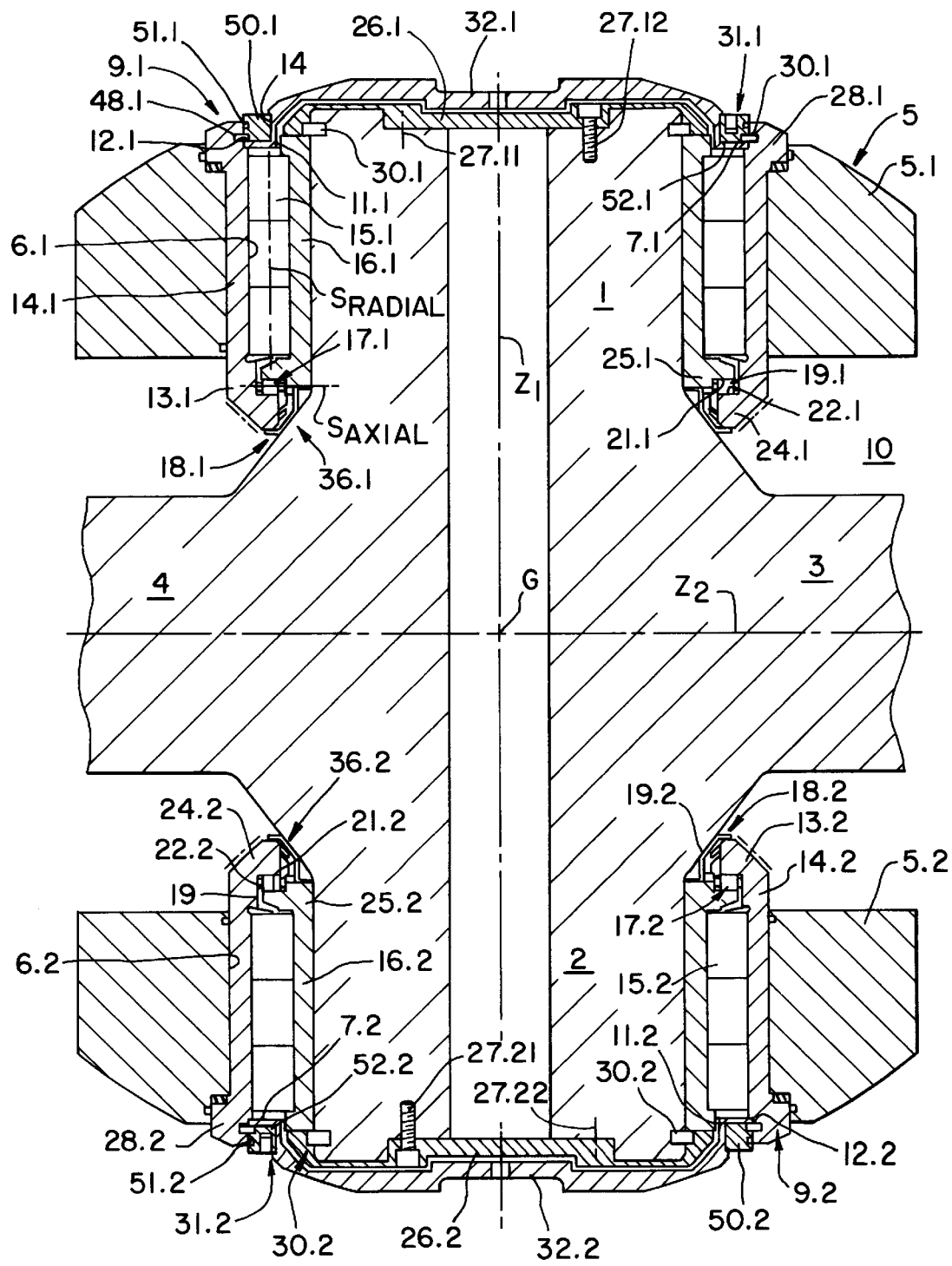
FIG. 1 is a sectional view of the inventional design of a U-joint apparatus through a universal joint in a plane extending through the spider arm axis and perpendicular to the joint axis showing a spider arm fitted in a yoke.

FIG. 1 depicts schematically, an inventional embodiment of a universal joint apparatus in fitting position, as a sectional illustration of a universal joint in a plane extending through the spider axis and perpendicularly to the joint axis, in a view of the spider arms of a universal joint fitted in a yoke. This figure shows for illustration purposes the four spider arms, however, for reason of simplicity depicting merely the fitting of two spider arms in a yoke. Illustrating further design options, FIGS. 3 and 4 each show for reason of simplicity only a section of a yoke, with identical elements being referenced identically in FIGS. 3 and 4.

A spider 10 is fitted with its spider arms 1 and 2 in a yoke 5 consisting of two yoke halves—a first yoke half 5.1 and a second yoke half 5.2—in the area of its eyes 6, presently 6.1 and 6.2, respectively, by means of a bearing each, presently 9.1 and 9.2. Offset 90° relative to the spider arms 1 and 2 fitted in the yoke 5, the spider arms 3 and 4 of the spider 10 are fitted in a further, second yoke, which is not illustrated in detail here and comprises as well two yoke halves, each spider arm fitted by means of a bearing in the area of their eyes. The yoke 5 is coupled, for example, to a not illustrated machine part of the power input side, while the spider arms 3 and 4 one coupled to (not illustrated) to a machine part of the power output end. The spider arm axes Z1 and Z2 of spider 10, which are to be understood as the axis through the spider arms 1 and 2 or 3 and 4, as illustrated, may be arranged in one plane or in two planes offset parallel relative to each other. The bearing 9.1, 9.2 of the spider arms 1 and 2 comprises a radial bearing, referenced 13.1 and 13.2, with an outer ring 14.1 or 14.2, rolling elements 15.1 or 15.2 and an inner ring 16.1 or 16,2 fashioned as a bearing bush, as well as an axial bearing 17.1 or 17.2 disposed in the area of the spider arm wrists 18.1 or 18.2.

The axial bearing 17.1 or 17.2 comprises at least rolling elements 19.1 or 19.2. These bear on an end face 21.1. or 21.2 of the inner ring 16.1 or 16.2 of the radial bearing 13.1 or 13.2 facing toward the joint axis G, which is to be understood as the axis through the intersection of spider arm axes Z1 and Z2 extending in one plane, and bearing on an end face 22.1 or 22.2 of an outer ring 14.1 or 14.2 of the radial bearing 13.1 or 13.2, facing away from the joint axis G, of a collar 24.1 or 24.2 forming a unit. These end faces 21.1, 21.2 and 22.1, 22.2 are formed by collars associated with the raceways of the radial bearing and assume here the function of the outer and inner rings of the axial bearing. The outer ring 14.1 or 14.2 of the radial bearing 13.1 or 13.2 features for that purpose a first inner collar 24.1 or 24.2 directed toward the spider arm axis Z1. The inner ring 16.1 or 16.2 of the radial bearing forms a unit with a collar 25.1 or 25.2, which is described as inner collar. Also given, however, is the not illustrated option of providing the axial bearing with additional raceway rings (outer and inner ring), which then bear on the end faces 21 and 22 of the collars 24.1, 24.2 and 25.1, 25.2.

The collars 24.1 or 24.2 and 25.1 or 25.2, viewed in fitting position, are arranged inside, in an axial direction beginning from the joint axis, preferably in the area of the spider arm wrist 18.1 or 18.2. Both raceway rings of the radial bearing 13.1 or 13.2, however, feature also in the area of their outer ends, in fitting position in axial direction, viewed from the yoke axis, each a further second collar. Associated with the inner ring 16.1 or 16.2 is an outer collar 26.1 or 26.2, presently in the form of a separate component, for example in the form of a cap-shaped closure as illustrated. The axial retention of the inner ring 16.1 or 16.2, e.g., is effected by means of a retaining ring 30.1 or 30.2.

The cap-shaped disk 26.1 or 26.2 is joined to the spider arms 1 or 2 employing screw joints 27.11, 27.12, 27.21, 27.22. Such design allows realizing a stop for the inner ring 16.1 or 16.2 in axial direction. Inner ring 16.1 or 16.2, which may be designed as a bearing bush, is pressed on the spider arm 1 or 2.

The outer ring 14.1 or 14.2 of the radial bearing 13.1 or 13.2 is coupled to a bearing cap 32.1 or 32.2 associated with each bearing bore by means of a form-fit joint 31.1 or 31.2. The bearing cap 32.1 or 32.2 does not participate in the transmission of force. The form-fit connection is realized in the area of a second collar 28.1 or 28.2 of the outer ring 14.1 or 14.2. The collar 28.1 or 28.2 extends in radial direction away from the spider arm axis Z1 and is outwardly, i.e., in the direction parallel to the spider arm axis, extended in design. The form-fit connection between outer ring 14.1 or 14.2 and the bearing cap 32.1 or 32.2 may be of various designs.

The outer ring 14.1 or 14.2 of the radial bearing 13.1 or 13.2 can be slipped, along the spider arm axis Z1 in the direction of the joint axis G, up to a stop 29.1 or 29.2 fashioned in the yoke, specifically in the eye of the yoke. This stop function, as illustrated in FIG. 1, is realized preferably by means of the collar 28.1 or 28.2 on the outer ring 14.1 or 14.2, which collar thus bears on the yoke 5.1, 5.2.

The axial forces created by the transverse acceleration acting in the direction of the spider arm axis Z1 away from the joint axis G, presently for instance in the direction of the yoke half 5.2, result in relieving the axial bearing 17.2 disposed in that direction, and result in a load on the axial bearing 17.1 disposed in spider arm axis direction, opposite to the working direction of the axial forces, on the side of the yoke half 5.1. The relieved bearing can in this state of operation be described as a passive bearing, the active bearing as a loaded bearing. In this embodiment, an axial force acting in the direction of the spider arm axis Z1 away from the joint axis G causes the elimination of the traction forces acting on the screw joints 27.21, 27.22 in this direction, and thus an axial displacement of the collar 26.2 of the radial bearing 13.2, thereby relieving the axial bearing 17.2. No transmission of force takes place via this axial bearing. The screws of the screw joint 27.11 and 27.12 are at the same time stressed more by traction on the opposite side of the yoke half 5.1. Resulting is an addition of the traction force prevailing in the screw joint 27.11, 27.12, and of the traction force acting on the spider arm 1 and resulting in a thrust stress upon the collar 26.1, and thus on the inner ring 16.1. The axial force bears by way of the thrust-stressed outer collar 26.1, retaining ring 30.1, inner ring 16.1, axial bearing 17.1, inner collar 24.1 via the outer ring 14.1 and the outer collar 28.1, on the yoke half 5.1.

Figure 5:
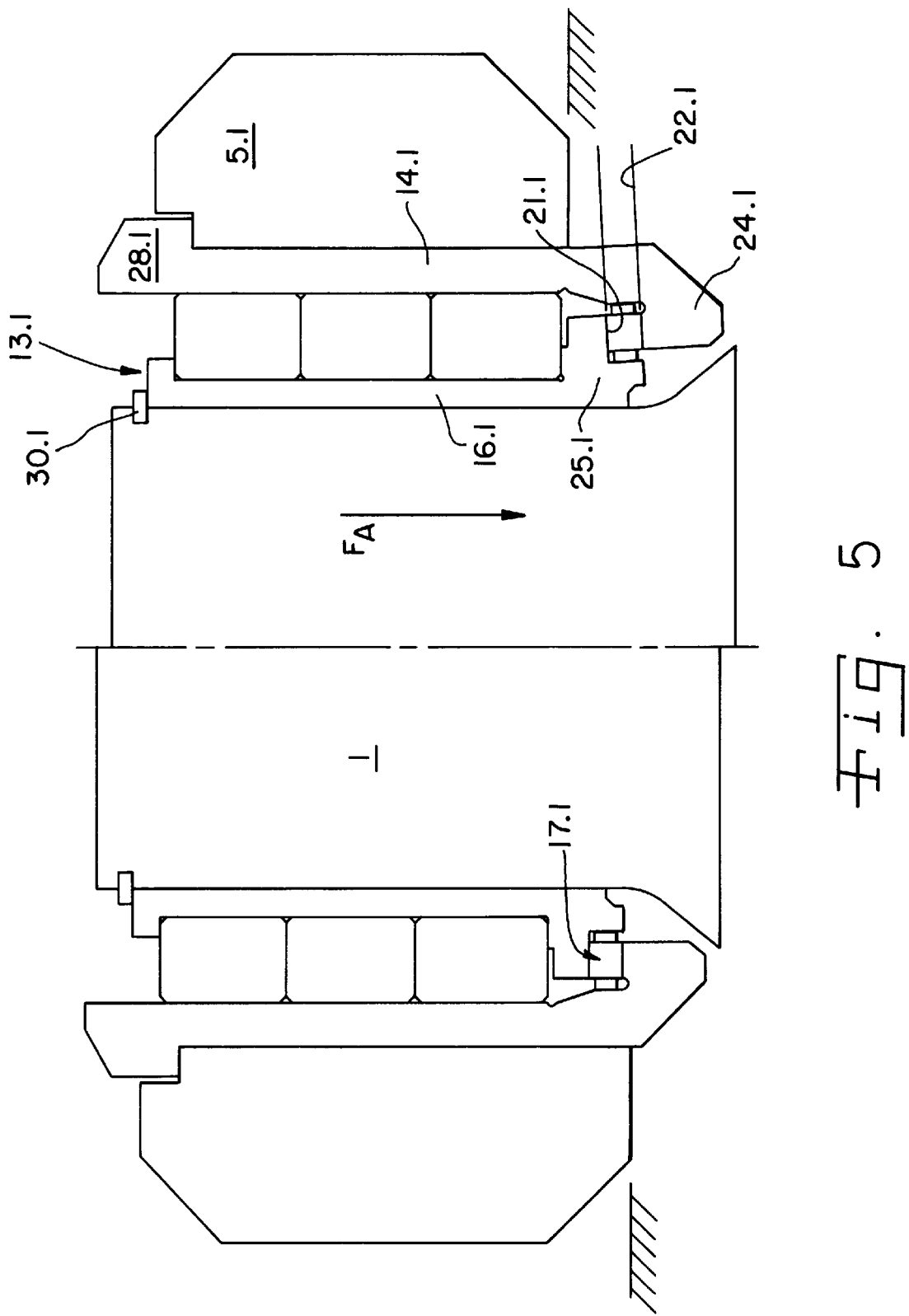
FIG. 5 is a schematic illustration of the positions of the raceways of the axial bearing under load.

The deformation of the torque-transmitting components of a universal joint is in the peripheral direction of the force so extreme that a disuniform load distribution may occur in the bearing and only a fraction of the possible load figure can be utilized. The absent plane-parallelity of the axial bearing raceways causes premature fatigue of the raceways and rolling elements and/or plastic deformations with their consequences (pitting and similar problems). On the other hand, the rated dynamic and static load figures of the bearings are guaranteed by the bearing manufacturers only with a rigid design of the bearing connection. To guarantee plane-parallelity of the raceways of the axial bearing with additionally effective peripheral force, the axial bearings 17.1, 17.2 or 17.3, 17.4 are so arranged, as a solution, that the deformation occurs on both collar elements 24 and 25 in same fashion. This is accomplished in that the possible leverages to which the axial bearing 17 or its raceways are exposed, are kept as low as possible. The arrangement and configuration of the collars 24 and 25 are preferably such that both feature substantially the same leverage. The parallelity of the raceways, i.e., of the end faces 21.1 and 22.1, 21.2 and 22.2, 21.3 and 22.3 or 21.4 and 22.4 is in this case maintained under load. This is schematically illustrated in FIG. 5 showing, in a simplified presentation, generally the deformation on the inner and outer rings 16.1 and 14.1 under load. It is evident that the raceways of the axial bearing 17.1, which are formed by the end faces 21.1 and 22.1 of the collars 24.1 or 25.1 on the inner and outer rings 16.1 or 14.1, assume a nearly parallel position to one another. The arrangement of the axial bearing 17.1 or 17.2 should be such that, based on a no-load state, its line of symmetry $S_{AXIAL}$ extending in axial direction extends, based on the rolling elements 23.1, substantially in the area of the axially extending line of symmetry $S_{RADIAL}$ of the rolling elements 15.1 of the radial bearing, preferably coincides with it, as illustrated in FIGS. 1 and 2.

The individual collars on the raceway rings (inner and outer ring) of the radial bearing may be fashioned with these as one component, i.e., as a single component, or alternately as separate components. The choice depends on applicational requirements.

The axial bearing 17.1 or 17.2 is, during operation, sealed in relation to the surroundings, by means of a seal 36.1 or 36.2. Its configuration is preferably such that it enables a one-sided lubricant supply to the axial bearing 17.1 or 17.2. The seal is preferably disposed in the area of the spider arm wrist 18.1 or 18.2.

To shield the radial bearing 13.1, a seal support 50.1 or 50.2 in the form of a ring or disk is provided between the bearing cap 32.1 or 32.2 and the outer collar 28.1 or 28.2 of the outer ring 14.1 or 14.2; said support being fixed in axial direction by means of retaining elements, for example retaining rings 48.1 and 48.2, and joined under form-fit to the bearing cap 32.1 or 32.2. To minimize during elastic deformation of the bearing bore in the yoke 5.1 or 5.2 under torque load a stress on the bearing cap in radial direction and to realize a form-fit joint 31.1 or 31.2 to the outer ring 14.1 or 14.2 of the radial bearing 13.1. or 13.2, the bearing cap 32.1 or 32.2 features in the area of its outer periphery a rim 11.1 or 11.2, which in fitting position extends in radial direction across part of the radial bearing width, preferably such that this part of the outer periphery of the bearing cap 32.1 shields the radial bearing 13.1, notably the rolling elements 15.1, in axial direction. The cap rim bears in fitting position with part of its inner surface 7.1 or 7.2 facing toward the joint axis on a partial surface 8.1 or 8.2 of a recess 12.1 or 12.2 provided for that purpose, on the outer collar 28.1 or 28.2 of the outer ring 14.1 or 14.2 of the radial bearing 13.1 or 13.2. The cap rim 11.1 or 11.2 is in fitting position elastically deformable in radial direction. To that end, it has a reduced cross section. The retaining ring 48.1 or 48.2 is then placed between the rim 11.1 or 11.2 of the bearing cap 32.1 or 32.2 and the collar 28.1 or 28.2, on the shield support 50.1 or 50.2. To adapt the bearing cap to the deformations of the bearing bores, it is coupled to the outer collar of the outer ring of the radial bearing under such form-fit that escape options are given in the event of elastic deformations of the cap rim. To realize the sealing function, two sealing elements 51.1 or 51.2 and 52.1 or 52.2 are associated with the seal support 50.1 or 50.2.

Figure 2A:
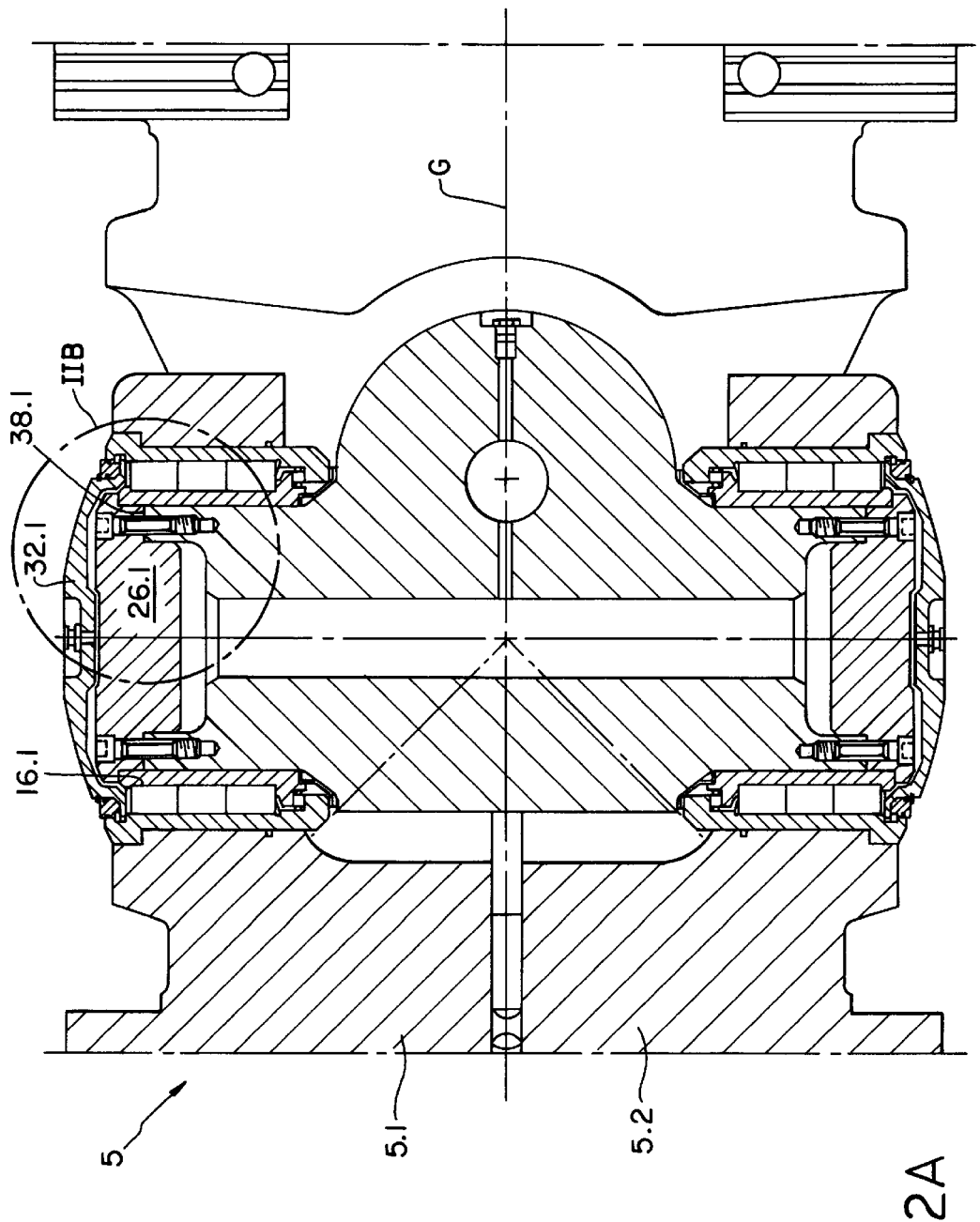
FIG. 2a is a sectional view of the improvement of a style according to FIG. 1 viewed from the right.

FIG. 2a shows an improvement of the embodiment relative to FIG. 1, viewed from the right. The spider fitted in the yoke is presently a design with arms arranged in two parallel planes that are offset relative to each other. The outer collar 26.1 associated in this embodiment in axial direction with the inner ring 16.1 is fashioned as a separate component, which in fitting position bears with a first part 37.1 (FIG. 2b) of its end face directed toward the joint axis G on the end face 38.1 (FIGS. 2a, 2b) of the spider arm 1 fitted in the yoke half 5.1, and with a second part 39.1 of its end face directed toward the yoke axis G on the end face 40.1 of the inner ring 16.1 of the radial bearing 13.1. Said end face 40.1 respectively faces away from the yoke axis forming an axial stop for the inner ring 16.1 of the radial bearing 13.1. The transmission of force occurs directly via the component 26.1 to the inner ring 16.1 of the radial bearing 13.1 without intervening transmission elements. Moreover, a further, second retaining ring 49.1 serving to retain the shielding support 50.1 or 50.2 in the fitting position arranged in the area of the cap rim, in axial direction above said support. Here too, the sealing elements 51.1 or 51.2 and 52.1 or 52.2 rest on the support 50.1 or 50.2. The sealing elements are fashioned, e.g., in the form of ring seals. They are hardly exposed to wear by relative movement, since the bearing cap is substantially not subjected to axial displacements.

Figure 2B:
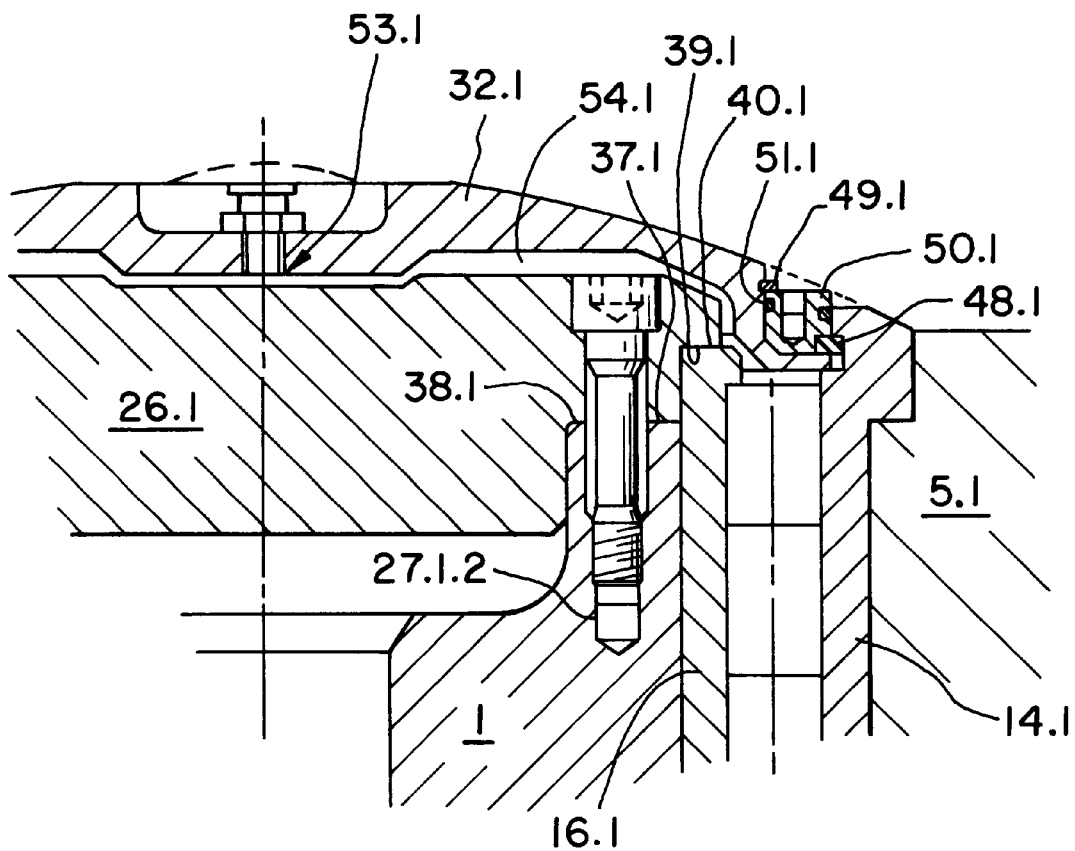
Figure 3:
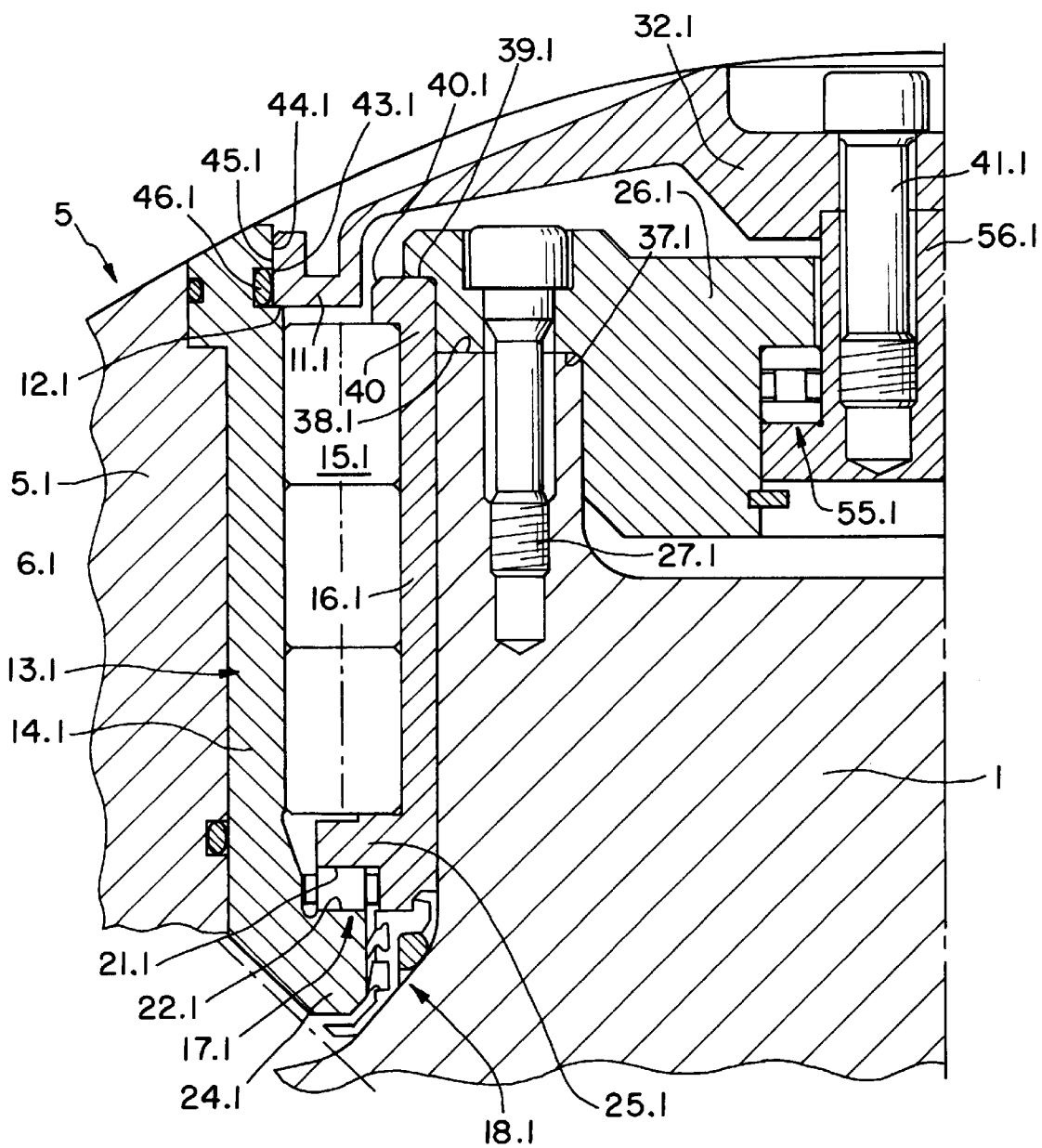
FIG. 3 is a sectional view of a further design of an inventional U-joint through a universal joint in a plane extending through the spider arm axis and perpendicularly to the joint axis showing a spider arm fitted in a yoke.

The bearing cap 32.1 or 32.2 forms in fitting position with the cap-shaped plate 26.1 or 26.2 a void 53.1 or 53.2 (FIG. 2b). Radial bearing, cap-shaped plate and bearing cap are so designed and arranged that they form a feed option in the form of an annular space 54.1 or 54.2 or of ducts that enable lubricant supply to the radial bearing by way of the bearing cap 32.1 or 32.2. FIG. 3 shows with the aid of a section of a universal joint apparatus a further embodiment where, similar to FIG. 2, the outer collar 126.1 associated in axial direction with the inner ring 116.1 is fashioned as a separate component which in fitting position bears with a first part 137.1 of its end face directed toward the joint axis G on the end face 138.1 of the spider arm 101 fitted in the yoke half 105.1, and with a second part 139.1 of its end face directed toward the yoke axis G on the end face 140.1 of the inner ring 116.1 of the radial bearing 113.1, said end face 140.1 directed away from the yoke axis, which forms an axial stop for the inner ring 116.1 of the radial bearing 113.1. The transmission of force occurs directly by way of the component 126.1 to the inner ring 116.1 of the radial bearing 113.1 without intervening transmission elements.

The bearing cap 132.1, for realizing axial securing, allows coupling by means of nonpositive or positive coupling elements 141.1, indirectly via an intermediate element 156.1, to the collar 126.1 by way of a bearing 155.1. The cap features a U-shaped rim 111.1 that bears with part of its end face directed in fitting position toward the joint axis G directly on part of the end face 108 of the recess 112.1 of the outer ring 114.1 of the radial bearing 113.1 directed away from the joint axis G. The bearing cap 132.1 and outer ring 114.1, notably the collar 128.1 of the radial bearing 113.1, have a design such that they are radially in contact as well with one another. The collar 128.1 forms with its surface 144.1 facing toward the spider arm axis Z1 a stop in radial direction, for the surface 145.1 of the cap rim 111.1 away from the spider arm axis Z1. To seal the radial bearing relative to the surroundings in fitting position, in the axially outer area, a sealing element 146.1 is provided between the bearing cap 132.1 and outer collar 128.1 of the outer ring 114.1 of the radial bearing 113.1, for example, in the form of a ring seal.

Figure 4:
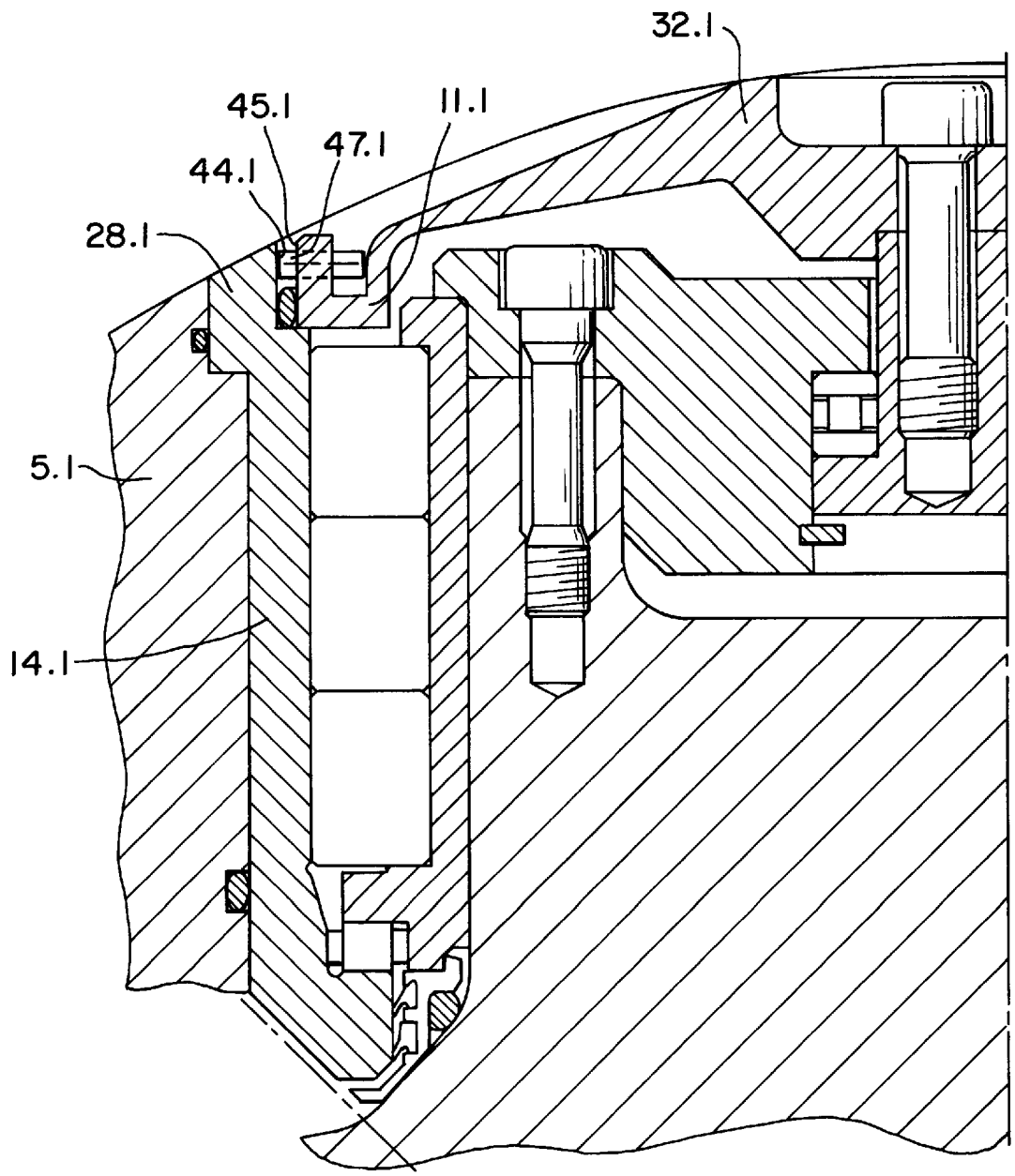
FIG. 4 is a sectional view of an improvement of the invention of FIG. 3.

In FIG. 4, which with the aid of a section of a universal joint apparatus shows an improvement of an embodiment relative to FIG. 3, the surface 244.1 of the outer ring 214.1 does not form a stop for the surface 245.1 of the rim 211.1 of the bearing cap 232.1. Bearing cap 232.1 and collar 228.1 of the outer ring 214.1 of the radial bearing 213.1 are coupled in radial direction, nonrotationally, by means of a connecting element 247.1.

In all of the embodiments, additional sealing elements, for example in the form of ring seals, are provided between bearing cap or intermediate element and collar 28.1. These are hardly subject to wear by relative movements, since the bearing cap is substantially not exposed to axial displacements.

A further embodiment option, not illustrated in detail here, consists in designing the outer ring of the axial bearing without the collar disposed inside in axial direction and, instead, letting the yoke assume the function of the collar. The yoke, especially its eye, is for that purpose given a reduced design, relative to the axially outer area, such that the inner raceway of the axial bearing can be formed by the yoke. The lubricant supply for the axial bearing can in this case be realized via the yoke, through ducts fashioned for that purpose.

The inventional bearing apparatus is suited for universal joints used in jointed shafts, but also in general for use in universal joints in other areas of application, for example, in connecting rotating components where the spider arms are fitted in yoke type flanges that can be joined to adjacent components.

I claim:

1. A universal joint apparatus for a shaft suited for transmission of torque, said joint apparatus comprising:
    a spider member having two opposite arms having radial ends;
    two yokes fitting with said spider arms, each said yoke having an eye;
    a bearing apparatus located adjacent said spider arm including an axial bearing and a radial bearing, said radial bearing having an outer ring (14.1, 14.2) and an inner ring (16.1, 16.2), said radial bearing disposed within a said eye of said yoke;
    an axial first outer collar (26.1, 26.2) associated with said inner ring radially outside said axial bearing and adjacent said radial end of said spider arm, said axial first outer collar directed toward the axis of said adjacent spider arm, said axial first outer collar forming an axial stop for seating said associated inner ring with said adjacent spider arm, said axial first outer collar adapted for one of positive and non-positive joining said radial end of said spider arm to said adjacent spider arm;
    said outer ring includes an axial first inner collar (24.1, 24.2) that extends radially in the direction of the axis of said adjacent spider arm, said axial first inner collar forming an axially direct inner raceway of said axial bearing;
    an axial second inner collar (25.1, 25.2) associated with said inner ring, said axial second inner collar directed radially away from the axis of said adjacent spider and said axial second inner collar forming an axially directed outer raceway of said axial bearing; and
    an axial second outer collar (28.1, 28.2) formed from a portion of said outer ring associated with said yoke eye.

2. The joint apparatus of claim 1 in which said first outer collar associated with said inner ring is formed by a separate component, said separate component having a cap shape with an end face and joined to said spider arm by means of at least one screw joint, said separate component end face forming a stop in the axial direction of said inner ring.

3. The joint apparatus of claim 2 further comprising a force-transmitting element disposed between said separate component and said inner ring.

4. The joint apparatus of claim 3 in which force-transmitting element is a retaining ring.

5. The joint apparatus of claim 1 in which said axial bearing includes rolling elements, and in which said axial bearing relative to the second inner collar of said radial bearing and said first inner collar of said outer ring have collars with the same leverage conditions with respect the position of said rolling elements of said axial bearing.

6. The joint apparatus of claim 5 in which said radial bearing includes rolling elements that have a line of symmetry $S_{RADIAL}$, said axial bearing rolling elements have a line of symmetry $S_{AXIAL}$, said line of symmetry $S_{AXIAL}$ is arranged in an axial direction in the area of said line of symmetry $S_{RADIAL}$.

7. The joint apparatus of claim 6 further comprising at least one sealing element is disposed between said rim area and said outer collar of said outer ring.

8. The joint apparatus of claim 1 further comprising:
    each said yoke includes a yoke half; and
    a bearing cap elastically deformable in the radial direction and associated with each said yoke half, said bearing cap adapted for an axial form-fit connection to said outer collar of said outer ring of said radial bearing.

9. The joint apparatus of claim 8 in which said outer ring includes a recess and said bearing cap includes a rim area of reduced cross section,
    said rim area covering in the radial direction, a portion of said radial bearing and which bears on at least indirectly said outer collar of said outer ring, said rim area adapted for insertion while under load in the radial direction into said recess.

10. The joint apparatus of claim 9 further including a seal support, said rim area retained by a form-fit between said seal support and said outer collar of said outer ring.

11. The joint apparatus of claim 1 further comprising:
    each said yoke includes a yoke half; and
    a bearing cap elastically deformable in the radial direction and associated with each said yoke half, said bearing cap connects axially by form-fit connection via an intermediate element and bearing arrangement to said outer collar of said inner ring.

12. The joint apparatus of claim 10 further comprising a turning lock disposed between said bearing cap and said outer ring.

13. The joint apparatus of claim 12 in which said bearing cap has a substantially U-Shaped rim area of reduced cross sectional area, said rim bearing at least partly on said outer collar of said outer ring.

14. The joint apparatus of claim 1 further comprising a sealing apparatus sealing the axial bearing between said inner ring and said outer ring.

15. The joint apparatus of claim 14 in which said sealing apparatus is a detachable gasket.

16. Universal joint apparatus of a jointed shaft suited for transmission of high torques, with a spider having radial ends (10);

with two yokes (5) for fitting the spider arms (1, 2, 3, 4) of the spider (10);

each arm (1, 2, 3, 4) of the spider (10) is fitted, with the aid of a bearing apparatus (9.1, 9.2) comprising a radial bearing (13.1, 13.2) with outer ring (14.1, 14.2) and an inner ring (16.1, 16.2) and an axial bearing (17.1, 17.2) in an eye (6.1, 6.2) of the yoke (5) associated with said arms;

the inner ring (16.1, 16.2) of the radial bearing (13.1, 13.2) forms a raceway (22.1, 22.2) of the axial bearing (17.1, 17.2);

associated with the inner ring (16.1, 16.2) is a first, in fitting position in axial direction outer collar (26.1, 26.2) that is directed toward the spider arm axis (Z1) of the spider arm (1, 2) fitted in the yoke (5) and forms an axial stop for seating the inner ring (16.1, 16.2) to the radial end of the spider arm;

the first outer collar (26.1, 26.2) associated with the inner ring (16.1, 16.2) of the radial bearing (13.1, 13.2) is adapted for one of nonpositive and positive joining to the spider arm (1, 2) fitted in the yoke and partly bears on the spider arm fitted in the yoke;

associated with the inner ring (16.1, 16.2), in fitting position in axial direction, is a second inner collar (25.1, 25.2) which radially extends away from the spider arm axis (Z1) of the spider arm (1, 2) fitted in the yoke;

the inner collar (25.1, 25.2) of the inner ring (16.1, 16.2) forms in axial direction the outer raceway (21.1, 21.2) of the axial bearing;

the outer ring (14.1, 14.2) of the radial bearing (13.1, 13.2) features in fitting position in axial direction a first inner collar (24.1, 24.2) that extends radially in the direction of the spider arm axis (Z1) of the spider arm (1, 2) fitted in the yoke;

the inner collar (24.1, 24.2) of the outer ring (14.1, 14.2) of the radial bearing (13.1, 13.2) forms in axial direction the inner raceway (22.1, 22.2) of the axial bearing;

the outer ring (14.1, 14.2) features in fitting position in axial direction a further, second, outer collar (28.1, 28.2) with which a stop in the yoke eye (6.1, 6.2) is associated.

* * * * *